US012272064B2

United States Patent
Payeli et al.

(10) Patent No.: US 12,272,064 B2
(45) Date of Patent: Apr. 8, 2025

(54) MONITORING FOLLICULAR FLUID FLOW USING IMAGE PROCESSING

(71) Applicant: Sravan Kumar Payeli, Bangalore (IN)

(72) Inventors: Sravan Kumar Payeli, Bangalore (IN);
Kalyan Adabala, Machavaram (IN);
Aamena Sultana, Gauribidanur (IN);
Pavani Srividya Mocharla, Bangalore (IN)

(73) Assignee: Sravan Kumar Payeli, Bangalore (IN)

( * ) Notice: Subject to any disclaimer, the term of this patent is extended or adjusted under 35 U.S.C. 154(b) by 512 days.

(21) Appl. No.: 17/286,275

(22) PCT Filed: Jan. 28, 2019

(86) PCT No.: PCT/IN2019/050063
§ 371 (c)(1),
(2) Date: Apr. 16, 2021

(87) PCT Pub. No.: WO2020/079703
PCT Pub. Date: Apr. 23, 2020

(65) Prior Publication Data
US 2021/0358125 A1   Nov. 18, 2021

(30) Foreign Application Priority Data
Oct. 18, 2018   (IN) .............................. 201841039598

(51) Int. Cl.
*G06T 7/00* (2017.01)
*G06T 7/194* (2017.01)
(Continued)

(52) U.S. Cl.
CPC ............ *G06T 7/0016* (2013.01); *G06T 7/194* (2017.01); *G06T 7/20* (2013.01); *G06T 7/62* (2017.01);
(Continued)

(58) Field of Classification Search
CPC ......... G06T 7/0016; G06T 7/194; G06T 7/20; G06T 7/62; G06T 7/90;
(Continued)

(56) References Cited

U.S. PATENT DOCUMENTS

| 11,622,744 B2 * | 4/2023 | Faghih | G06T 7/155 600/447 |
| 2015/0201967 A1 * | 7/2015 | Modi | G01N 21/59 600/34 |

(Continued)

FOREIGN PATENT DOCUMENTS

| EP | 0 539 189 A1 | 4/1993 | |
| EP | 3 106 844 A1 | 12/2016 | |
| WO | WO-2011145818 A2 * | 11/2011 | ......... A61B 1/00052 |

OTHER PUBLICATIONS

International Search Report for PCT/IN2019/050063, dated Jun. 19, 2019, 3 pages.
(Continued)

*Primary Examiner* — Oneal R Mistry
*Assistant Examiner* — Vaisali Rao Koppolu

(57) ABSTRACT

Examples of monitoring of follicular fluid flow using image processing are described herein. Image frames pertaining to a pre-defined target area defined for a collection tube during an ovum pick-up (OPU) step of an in-vitro fertilization (IVF) procedure may be obtained in real-time. The target area corresponds to a region indicating entry of a follicular fluid into the collection tube. Thereafter, the image frames may be processed to detect occurrence of a flow of the follicular fluid as well as presence of blood in the follicular fluid. Accordingly, a first alert signal indicating detection of occurrence of flow of the follicular fluid and a second alert signal indicating presence of blood in the follicular fluid, may be generated to notify a medical practitioner.

16 Claims, 4 Drawing Sheets

(51) Int. Cl.
G06T 7/20 (2017.01)
G06T 7/62 (2017.01)
G06T 7/90 (2017.01)
G08B 21/18 (2006.01)

(52) U.S. Cl.
CPC ............... *G06T 7/90* (2017.01); *G08B 21/18* (2013.01); *G06T 2207/10024* (2013.01); *G06T 2207/30024* (2013.01)

(58) Field of Classification Search
CPC . G06T 2207/10024; G06T 2207/30024; G06T 2207/10016; G06T 2207/20224; G06T 7/254; G08B 21/18
See application file for complete search history.

(56) References Cited

U.S. PATENT DOCUMENTS

| 2016/0335779 | A1* | 11/2016 | Satish | G06T 7/0016 |
| 2017/0035342 | A1* | 2/2017 | Elia | A61B 5/14507 |
| 2018/0130205 | A1* | 5/2018 | Chen | G02B 21/06 |
| 2021/0022717 | A1* | 1/2021 | Cnaani | A61B 10/0283 |

OTHER PUBLICATIONS

Written Opinion for PCT/IN2019/050063, dated Jun. 19, 2019, 6 pages.

* cited by examiner

250

MONITORING FOLLICULAR FLUID FLOW USING IMAGE PROCESSING

TECHNICAL FIELD

The present subject matter relates, in general, to follicular fluid flow monitoring and, in particular but not exclusively, to monitor follicular fluid flow using image processing.

BACKGROUND

Invitro Fertilization (IVF) is a process of fertilization where male and female gametes are collected outside the body and are mixed together to allow fertilization in vitro (in a dish). The IVF process involves removing an ovum or ova from a woman's ovaries and letting sperm fertilize the removed ovum or ova in a liquid medium in a laboratory. During the IVF process, the woman's ovaries are stimulated to form multiple follicles. These follicles are randomly distributed inside the ovary or may be on the surface of the ovary. Further, each follicle contains follicular fluid carrying an ovum.

BRIEF DESCRIPTION OF DRAWINGS

The detailed description is provided with reference to the accompanying figures. It should be noted that the description and the figures are merely examples of the present subject matter and are not meant to represent the subject matter itself.

Figure 1:
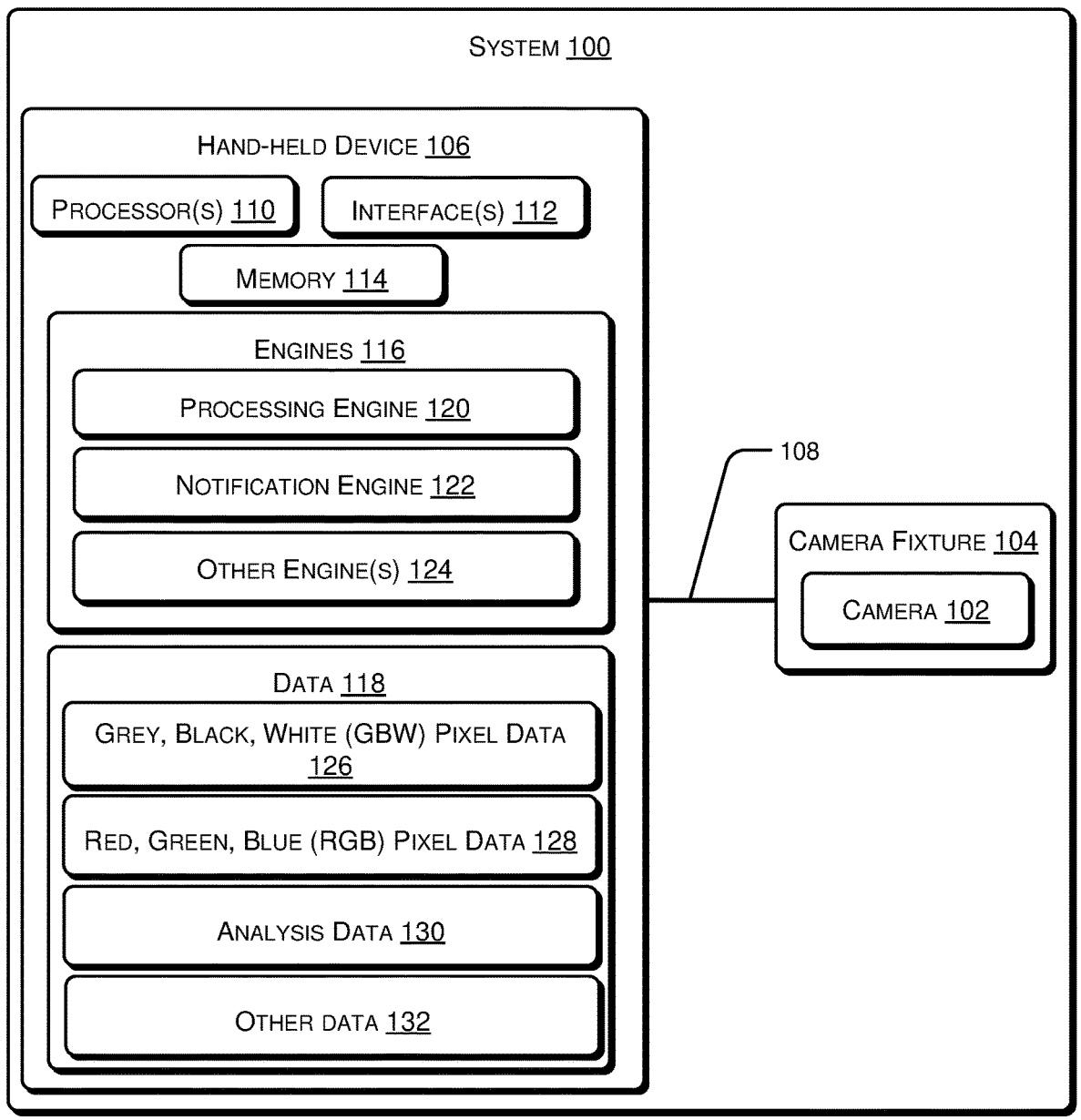
FIG. 1 schematically illustrates a block diagram of a system for monitoring follicular fluid flow, according to an example implementation of the present subject matter.

Throughout the drawings, identical reference numbers designate similar elements, but may not designate identical elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The process of IVF includes various stages, such as Ovum Pick Up (OPU) stage. The OPU stage is a key step in the IVF process in which the follicles are punctured to harvest oocytes. In the OPU stage, follicles are visualized through a probe, such as an ultrasound transvaginal probe. Further, a needle guide is attached to the probe to facilitate movement of the needle in front and back directions. During the OPU stage, the needle is passed through transvaginal route to reach the follicles which are located on or in the ovary which is opposite to the end through which the needle penetrates. The needle usually contains a hole throughout a length of the needle and is provided with a system to collect follicular fluid through a vacuum pressure generating device by aspiration method.

In operation, the needle is inserted into a follicle of an ovary of a patient through ultrasound guidance by a physician via transvaginal route. Thereafter, negative pressure is created in a collection tube with the help of a suction pump operated by a foot pedal. For example, the foot pedal is pressed to increase the negative pressure. The negative pressure so created is applied inside the follicle which aspirates the follicular fluid into the collection tube. After complete aspiration of single follicle, the needle is passed through an ovarian tissue to reach another follicle. As the foot pedal does not facilitates in stopping the negative pressure inside the follicle, residual negative pressure is always applied on the ovarian tissue. Ovary is made of ovarian tissue (stroma), and blood vessels that supply nourishment for the follicles to generate ova. As the needle is passed through the ovarian tissue, the needle tends to puncture the blood vessels while moving the needle between consecutive follicles. As blood in the vessels possesses an average blood pressure of 80 mmHG, the residual aspiration pressure combined with blood pressure in the vessel inevitably leads to the aspiration of blood and mixing with follicular fluid.

In addition, during the OPU stage, the collection tube is placed behind the medical practitioner. Therefore, the medical practitioner may require assistance to stay informed about flow of the follicular fluid, filling of the collection tube, change of each collection tube, presence of blood in the follicular fluid, and so on. As the medical practitioner takes human assistance in performing the OPU, there may be lack of coordination between the medical practitioner and an assistant. Further, the assistant may not provide alerts to indicate follicular fluid flow speed and presence of blood in the follicular fluid. In addition, the medical practitioner may not receive a total volumetric analysis and summary on each patient for total follicular fluid collected, total time taken for the OPU stage, respective patient identity, and so on.

Examples of the present subject matter relating to monitoring of flow of follicular fluid through image processing are described herein. Various image frames pertaining to a pre-defined target area of a collection tube are processed in real time to determine flow of the follicular fluid into the collection tube as well as presence of blood in the follicular fluid. Based on the image processing, different alert signals may be generated to indicate the flow of the follicular fluid or presence of blood in the follicular fluid.

The present subject matter describes methods and systems for monitoring follicular fluid flow. To monitor the follicular fluid flow, image frames pertaining to a pre-defined target area of a collection tube, are obtained in real time. In an example, a camera is placed adjacent to the collection tube during an ovum pick-up (OPU) stage of an in-vitro fertilization (IVF) procedure. In an aspect, the target area corresponds to a region showing entry of follicular fluid into the collection tube, through another end of an ovum pickup needle. The flow of the follicular fluid into the collection tube may be displayed to a medical practitioner through a display unit. In an example, the display unit is positioned in proximity to a follicle monitoring screen such that the display unit is easily visible to the medical practitioner.

Further, the images frames may be processed to detect occurrence of a flow of the follicular fluid. In an implementation, to detect occurrence of a flow of the follicular fluid, a pixel difference between two consecutive image frames may be determined over time. For example, grey, black, and white colored pixels may be analyzed in each of the image frames over time. Upon detection of the flow of the follicular fluid into the collection tube, a first alert signal may be generated to notify a medical practitioner about commencement of the flow of the follicular fluid.

In the present implementation, the image frames may be further processed to detect presence of blood in the follicular fluid, once the follicular fluid has started to flow in the collection tube. In order to detect the presence of blood in the follicular fluid, red, green, and blue colored pixels may be analyzed in each of the image frames. In case blood is detected in the follicular fluid, a second signal may be generated to notify the medical practitioner about the presence of blood. In an example, the first and second alert signals may be an audio signal or a visual signal or both.

As the display unit is placed in front of the medical practitioner, the present subject matter facilitates the medical practitioner to monitor flow of the follicular fluid in real time, without any assistance. Further, the alert signals enable the medical practitioner to remain aware of the flow as well as presence of blood in the follicular fluid, without constantly looking at the display unit. Visualization of follicular flow speed and presence of blood would help the medical practitioner to accordingly guide the needle for efficient aspiration. As a result, the present subject matter may facilitate in minimizing ovarian physical damage. In case of presence of blood, the medical practitioner may stop applying the pressure or move away from the area thereby providing better patient care. Minimizing blood in the follicular fluid provides better fertilization rates of ova.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 schematically illustrates a block diagram of a system 100 for monitoring follicular fluid flow, according to an example implementation of the present subject matter. The system 100 may include one or more camera(s) 102 to capture image frames pertaining to a pre-defined target area defined on a collection tube during an ovum pick-up (OPU) stage of an in-vitro fertilization (IVF) procedure. In an example, the camera 102 may be an On-The-Go (OTG) camera. The camera 102 may be positioned in front of the pre-defined target area of the collection tube to capture the image frames. For instance, the camera 102 is so placed that the pre-defined area is covered by the camera 102.

In an implementation, the camera 102 may be held in a pre-defined position in front of the collection tube through at least one camera fixture 104. The pre-defined position is corresponding to an inlet of the follicular fluid in the collection tube. In an example, the camera fixture 104 is fixed at a particular position. In another example, the camera fixture 104 may be adjustable. In an example, a size of the collection tube may be fixed or varying. Further, the collection tube is positioned inside a heating block (not shown) to store the follicular fluid at a body temperature. The heating block maintains a constant temperature of the collection tube such that the follicular fluid being collected in the collection tube is maintained at body temperature. To hold the camera 102 without involving additional components, the camera fixture 104 is designed to have the same size as that of the collection tube so that the camera fixture 104 can also be positioned within the heating block to capture the predefined target area on the collection tube either partially or fully. In an example, the camera fixture 104 may be made of a stainless-steel material or any other material.

In an implementation, the camera 102 may be coupled to a hand-held device 106 through a cable 108. The cable 108 is provided long enough to connect the camera 102, placed behind the medical practitioner, with the hand-held device 106 placed in front of the medical practitioner. For example, the cable 108 may have a length in a range of about 2 meters to about 5 meters. The placement of the hand-held device 106 is such that the medical practitioner does not have to rely on assistance to check a progress of the follicular fluid collection events. In the present implementation the hand-held device 106 is not limited to, smart phones, mobile devices, and the like.

Further, the system 100 may be coupled to a database (not shown) either directly or through a network. In an example, the database may store information that may be accessed by the system 100. The database may store data in various formats, such as images, videos, voice, relational tables, object oriented relational tables, indexed tables pertaining to follicular fluid flow and collection events.

In an implementation, the hand-held device 106 includes one or more processor(s) 110, an interface(s) 112, and a memory 114, coupled to the processor(s) 110. The processor(s) 110 can be a single processing unit or a number of units, all of which could include multiple computing units. The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 is configured to fetch and execute computer-readable instructions and data stored in the memory 114.

The interface(s) 112 may include a variety of software and hardware interfaces, for example, interfaces for peripheral device(s), such as a keyboard, a mouse, a display unit, an external memory, and a printer. The interface(s) 112 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 112 may include one or more ports for connecting the hand-held device 106 to the camera 102. In various example implementations discussed below, the hand-held device 106 communicates with the camera 102 via the interfaces 112. In an example, the interface 112 may include a display unit of the hand-held device 106.

The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 114 also includes engines 116 and data 118.

The engines 116, amongst other things, include routines, programs, objects, components, data structures, etc., which perform particular tasks or implement particular abstract data types. The engines 116, includes a processing engine 120, a notification engine 122, and other engines(s) 124. The other engine(s) 124 may include programs or coded instructions that supplement applications and functions of the hand-held device 106.

On the other hand, the data 118, inter alia serves as a repository for storing data processed, received, and generated by one or more of the engines 116. The data 118 includes, for example, Grey, Black, White (GBW) pixel data 126, Red, Green, Blue (RGB) pixel data 128, analysis data 130, and other data 132. The other data 132 includes data generated as a result of the execution of one or more engines in the other engine(s) 124.

In an implementation, the camera 102 may capture image frames pertaining to the pre-defined target area defined for the collection tube during the OPU procedure. In an example, the target area may pre-defined by the medical practitioner before commencing the OPU procedure. The target area captures an entry point of the follicular fluid into the collection tube. Further, the image frames so captured may be transmitted to the hand-held device 106 in real-time. Although, the camera 102 is shown to be coupled to the hand-held device 106 through the cable 108, the camera 102 may be wirelessly coupled to the hand-held device 106.

The processing engine 120 of the hand-held device 106 may obtain the image frames, in real-time from the camera 102 and process the image frames to detect the occurrence of the flow of the follicular fluid. In an aspect, prior to processing the image frames to detect occurrence of the flow of the follicular fluid, the processing engine 120 may perform a background correction on the image frames. For example, the processing engine 120 may perform a background subtraction to extract and analyze a foreground of the image frames. The background correction is performed to remove any false positives or false negatives during the processing of image frames to detect the occurrence of the flow of the follicular fluid.

Upon performing the background correction, the processing engine 120 may analyze the GBW pixels in each of the image frames. In an example, the processing engine 120 may store analyzed data as the GBW pixel data 126. Based on the analysis, the processing engine 120 may compute a pixel difference between two consecutive image frames over time. For example, the pixel difference may occur when the follicular fluid may start flowing into the collection tube. For instance, when there is no flow of the follicular fluid, the image frames may capture same pixels, whereas, when the flow of the follicular fluid begins, the pixels may change in the subsequent image frames. As a result, the image frames captured within the pre-defined target area of the collection tube may indicate a change in pixels. The processing engine 120 may accordingly analyze a pixel shift or change in the image frames, to indicate occurrence of the flow of the follicular fluid.

To inform the medical practitioner about the occurrence of the flow of the follicular fluid, the notification engine 122 may generate a first alert signal. In an example, the first alert signal may be audio signals, such as short periodic beeps indicating flow of the follicular fluid into the collection tube. In another example, the first alert signal may be a video signal, such as a continuous wave to indicate the flow of the follicular fluid into the collection tube. In an example, the first alert signal may be a combination of the audio signal and the video signal. Accordingly, the system 100 facilitates the medical practitioner to remain informed about progress of the follicular fluid collection events without completely relying on assistance.

Further, when the follicular fluid is not flowing into the collection tube, for example, due to complete extraction of the follicular fluid from one follicle, or due to any other reason, the notification engine 122 may stop generating the first alert signal. As a result, the medical practitioner may immediately take actions accordingly.

Once the flow of the follicular fluid is detected, the processing engine 120 may further process subsequent image frames to detect presence of blood in the follicular fluid. In order to detect presence of blood in the follicular fluid, the processing engine 120 may analyze Red, Green, and Blue (RGB) colored pixels in each of the image frames. Based on the analysis, the processing engine 120 may identify presence of the red colored pixels in the image frames. The presence of the red colored pixels is indicative of presence of blood in the follicular fluid. In an example, the processing engine 120 may store analyzed data as the RGB pixel data 128.

As described with reference to detection of flow of the follicular fluid, upon detection of blood, the notification engine 122 may generate a second alert signal to indicate the presence of blood in the follicular fluid. In an aspect, the second alert signal may be different from the first alert signal. For example, the second alert signal may be an audio signal, such as long periodic audio beeps, or a video signal in the form of flashes of warning, or both. In an implementation, the notification engine 122 may stop the first alert signal and generate the second alert signal to indicate the events of the situation. In response to the second alert signal, the medical practitioner may stop the application of the negative pressure immediately or deviate from the site of puncture.

Further, the processing engine 120 may perform a volumetric analysis of the follicular fluid collected during the OPU procedure. For example, the processing engine 120 may compute a total volume of the follicular fluid collected for a patient during the OPU procedure. In addition, the processing engine 120 may compute a percentage of Red colored pixels in the image frames over a time period for which the flow of the follicular fluid is detected. In an example, the processing engine 120 may store the data pertaining to the analysis as the analysis data 130.

Upon completion of the OPU procedure, the notification engine 122 may provide the volumetric analysis of the follicular fluid collected in the collection tube during entire OPU procedure, on the display unit of the hand-held device 106. This may enable the medical practitioner to get a full report of the OPU procedure carries out for a particular patient.

In an implementation, as the system 100 may be coupled to the database, the system 100 may maintain patient record in the database. For example, the medical practitioner may save details pertaining to the OPU procedure for each patient in the database. For example, the medical practitioner may record video of the entire OPU procedure along with the images as captured by the camera 102. The images and videos may be associated with a unique ID as provided by the medical practitioner for each patient. Further, the images and videos may be time stamped before getting stored in the database so that the images and videos may be provided as an evidence to OPU procedure.

In an example, the medical practitioner may record the entire OPU procedure as video and audio files and may be provided names as following:

BM00000-20180927-1646

Such file naming may provide details such as, patient id, details of OPU procedure, date and time at the commencement of the OPU procedure, and time at the completion of the OPU procedure, along with total volume and blood percentage.

Accordingly, the system 100 of the present subject matter facilitates the medical practitioner to perform real time monitoring of the follicular fluid collection. In addition, the medical practitioner may remain informed about puncturing of any blood vessels and the negative pressure applied in the ovary. Further, as the medical practitioner is not completely dependent on assistance, human errors may be reduced. Further, the system 100 may provide analytical data on the volume of the follicular fluid collected to study the effectiveness of the OPU procedure.

Figure 2A:
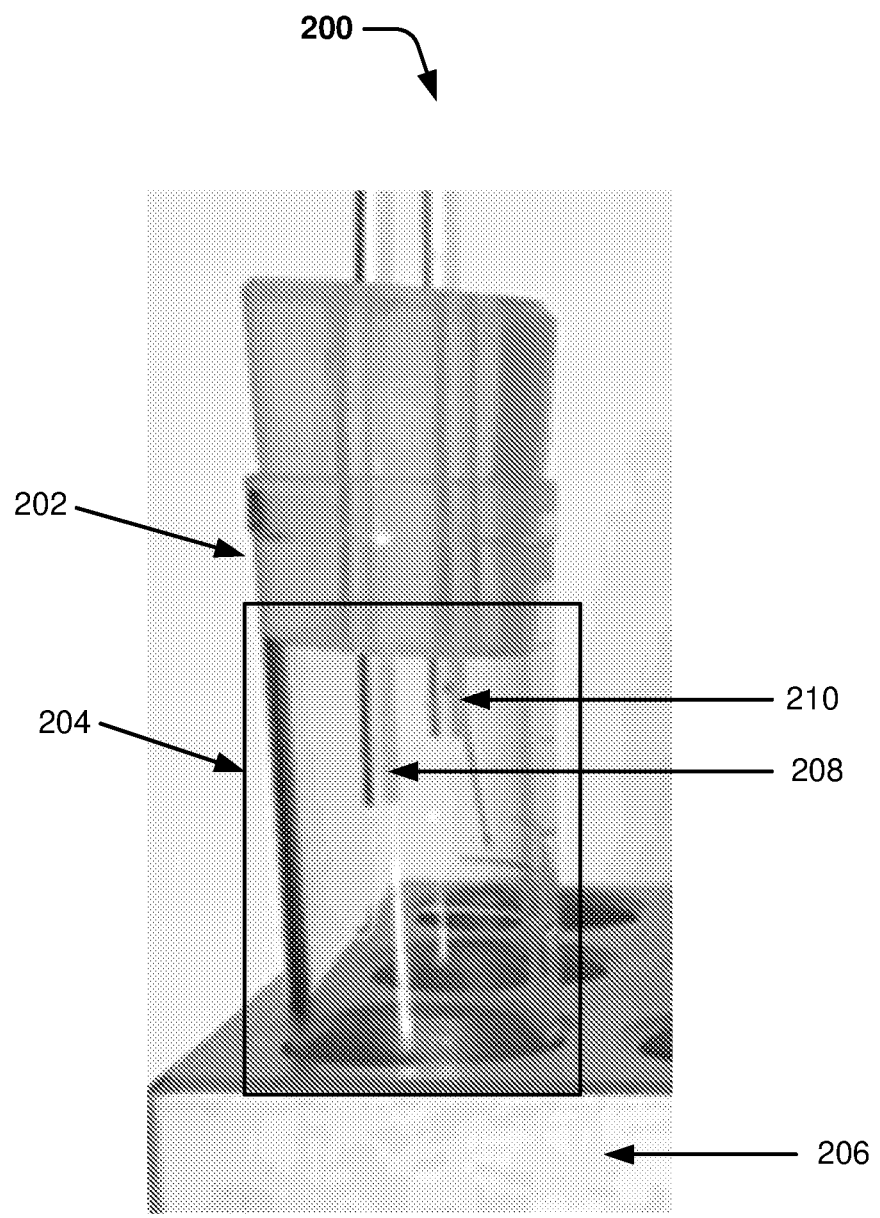
FIG. 2A depicts a pre-defined target area on a collection tube for monitoring follicular fluid flow, according to an example implementation of the present subject matter.
Figure 2B:
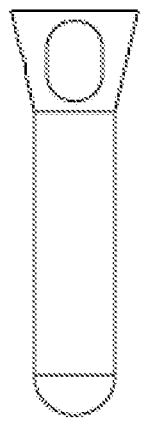
FIGS. 2B-2E illustrate various perspective views of a camera fixture, according to an example implementation of the present subject matter.
Figure 2C:
Figure 2D:
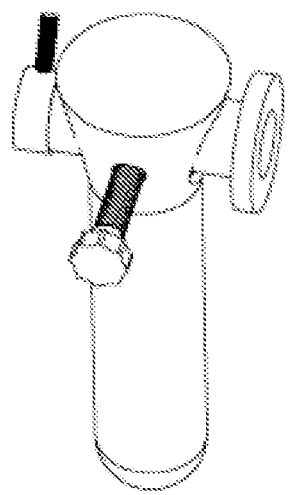
Figure 2E:
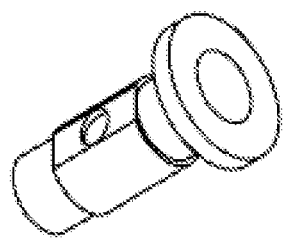

FIG. 2A depicts a perspective view 200 of a collection tube 202 for monitoring follicular fluid flow, according to an example implementation of the present subject matter. As explained with reference to FIG. 1, a user, such as the medical practitioner or an assistant may position the camera (not shown) in front of the collection tube 202. Thereafter, the medical practitioner may define or select the pre-defined target area 204 on the collection tube 202. The pre-defined target area 204 depicts an inlet or entry point of the follicular fluid in the collection tube 202. The camera is so adjusted that the image frames capture the pre-defined target area 204 on the collection tube 202.

In operation, the collection tube 202 is placed within the heating block, such as the heating block 206. In an example, the heating block 206 is designed to maintain a constant temperature of 37 degrees Celsius such that the follicular fluid being collected in the collection tube 202 is maintained at body temperature. Thereafter, the collection tube 202 is connected with two tubes, namely, a follicular fluid receiving tube 208 and a negative pressure creating tube 210. In an example, the pre-defined target area 204 is defined with respect to the follicular fluid receiving tube 208.

FIGS. 2B-2E illustrate various perspective views 250 of the camera fixture 104, according to an example implementation of the present subject matter. The camera fixture 104 may have similar dimensions as that of the collection tube so that the camera fixture 104 may be positioned within heating blocks adjacent for better stability to the collection tube to capture the image frames from a close range. As a result, the camera fixture 104 may be positioned without requiring any additional support. Further, the camera fixture 104 may include passage or holes there through to position the camera (not shown). Further, the camera fixture 104 may facilitate in adjusting an angle of the camera with respect to the collection tube. For example, the camera fixture 104 allows movement of the camera in an up-down and a right-left direction so as to entirely capture the predefined area on the collection tube.

Figure 3:
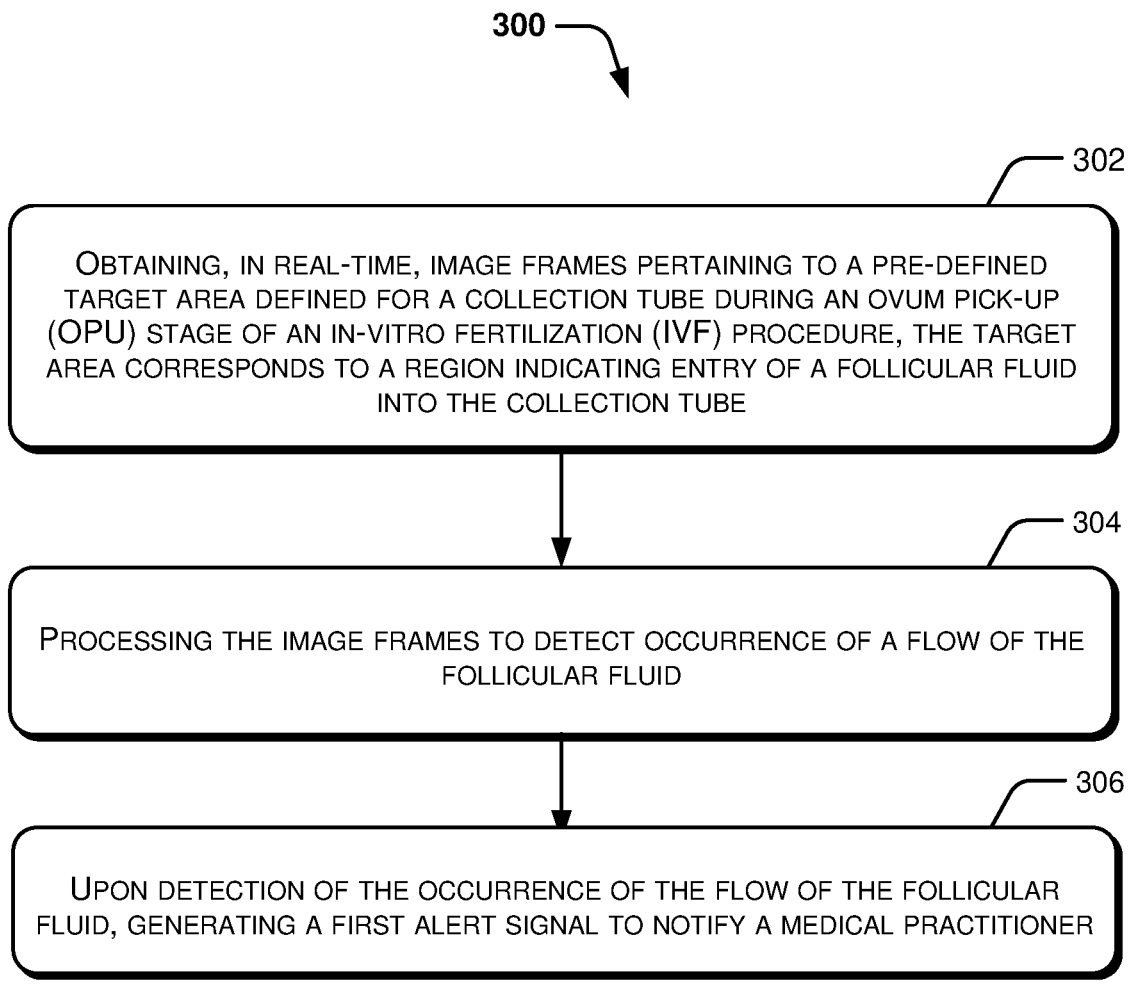
FIG. 3 illustrates a method for monitoring follicular fluid flow, according to example implementations of the present subject matter.

FIG. 3 illustrates a method 300 for monitoring follicular fluid flow, according to example implementations of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network.

The order in which the method 300 is described is not intended to be construed as a limitation, and any number of the described method blocks can be combined in any order to implement the method 300, or an alternative method. Furthermore, the method 300 can be implemented in any suitable hardware, software, firmware or combination thereof.

At block 302, the method 300 may include obtaining, in real-time, image frames pertaining to a pre-defined target area defined for a collection tube during an ovum pick-up (OPU) step of an in-vitro fertilization (IVF) procedure, wherein the target area corresponds to a region indicating entry of a follicular fluid into the collection tube. In an implementation, the image frames may be captured by the camera of the system and obtained by the processing engine.

At block 304, the image frames may be processed to detect occurrence of a flow of the follicular fluid. In an implementation, the processing engine 120 may perform the processing on the image frames. In an aspect, the processing engine 120 may perform a background correction on the image frames. For example, the processing engine 120 may perform a background subtraction to extract and analyze a foreground of the image frames.

Once the background correction is performed, the processing engine 120 may process the image frames to detect occurrence of the flow of the follicular fluid. For example, to detect the flow of the follicular fluid in the collection tube, the processing engine 120 may identify a flow rate of the follicular fluid in the collection tube based on a pixel difference between two consecutive image frames over time. In the present example, the processing engine 120 may analyze Grey, Black, and White (GBW) colored pixels in each of the image frames. Based on the pixel difference between two or more consecutive image frames, the processing engine 120 may detect the flow of the follicular fluid with or without blood.

In another implementation, the image frames may be further processed to detect presence of blood in the follicular fluid, upon occurrence of the flow of the follicular fluid. For example, the processing engine 120 may analyze Red, Green, and blue (RGB) colored pixels in each of the image frames to detect presence of blood in the follicular fluid. In addition, the processing engine 120 may compute a percentage of red pixels in the image frames over a time period for which the flow of the follicular fluid is detected.

At block 306, the method 300 may include generating a first alert signal to notify a medical practitioner, upon detection of the occurrence of the flow of the follicular fluid. In an implementation, the notification engine 122 may generate the first alert signal. In an example, the first alert signal may be an audio signal, a video signal, or both.

Further, the notification engine 122 may generate a second alert signal periodically to notify the detection of blood in the follicular fluid. In an example, the second alert signal may be different from the first alert signal to enable the medical practitioner to differentiate between the first alert signal indicating flow of the follicular fluid and the second alert signal indicating presence of blood in the follicular fluid. Upon completion of the OPU procedure, the notification engine 122 may provide a volumetric analysis or a summary of the follicular fluid collected in the collection tube during entire OPU procedure, on the display unit of the hand-held device 106.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A method comprising:
   obtaining, in real-time, image frames pertaining to a pre-defined target area defined on a collection tube during an ovum pick-up (OPU) step of an in-vitro fertilization (IVF) procedure, wherein the target area corresponds to a region indicating entry of a follicular fluid into the collection tube;
   processing the image frames to detect occurrence of a flow of the follicular fluid; and
   upon detection of the occurrence of the flow of the follicular fluid, generating a first alert signal to notify a medical practitioner;
   processing the image frames to detect presence of blood in the follicular fluid, upon occurrence of the flow of the follicular fluid; and
   upon detection of the occurrence of flow of blood, generating a second alert signal periodically to notify detection of blood in the follicular fluid.

2. The method as claimed in claim 1, wherein processing the image frames to detect the flow of the follicular fluid in the collection tube comprises identifying a flow rate of the follicular fluid in the collection tube based on a pixel difference between two consecutive image frames over time.

3. The method as claimed in claim 2, wherein identifying the flow rate of the follicular fluid in the collection tube comprises analyzing grey, black, and white colored pixels in each of the image frames.

4. The method as claimed in claim 1, wherein processing the image frames to detect the presence of blood in the follicular fluid comprises analyzing red, green, and blue (RGB) colored pixels in each of the image frames.

5. The method as claimed in claim 1, wherein the method comprises providing volumetric analysis of the follicular fluid collected in the collection tube.

6. The method as claimed in claim 1, wherein the method comprises performing a background correction on the image frames prior to processing the image frames.

7. The method as claimed in claim 1, wherein the method comprises computing a percentage of red pixels in the image frames over a time period for which the flow of the follicular fluid is detected.

8. A system comprising:
   a camera to capture image frames;
   a processing engine, coupled to the camera, to:
      obtain, in real-time, the image frames pertaining to a pre-defined target area defined for a collection tube during an ovum pick-up (OPU) step of an in-vitro fertilization (IVF) procedure, wherein the target area corresponds to a region indicating entry of a follicular fluid into the collection tube; and
      process the image frames to detect occurrence of a flow of the follicular fluid; and
      process the image frames to detect presence of blood in the follicular fluid along with the flow of the follicular fluid, upon occurrence of the flow of the follicular fluid; and
   a notification engine, coupled to the processing engine, to:
      generate a first alert signal to notify a medical practitioner, upon detection of occurrence of the flow of the follicular fluid; and
      generate a second alert signal periodically to notify detection of flow of blood in the follicular fluid.

9. The system as claimed in claim 8, wherein the system comprises at least one camera fixture for holding the camera in a pre-defined position corresponding to an inlet of the follicular fluid in the collection tube.

10. The system as claimed in claim 8, wherein the system comprises a display unit to display the flow of the follicular fluid into the collection tube, wherein the display unit is positioned in proximity to a follicle monitoring screen.

11. The system as claimed in claim 8, wherein, to detect the flow of the follicular fluid in the collection tube, the processing engine is to identify a flow rate of the follicular fluid in the collection tube based on a pixel difference between two consecutive image frames over time.

12. The system as claimed in claim 11, wherein the processing engine is to analyze grey, black, and white (GBW) colored pixels in each of the image frames-shift, to detect the flow of follicular fluid into the collection tube.

13. The system as claimed in claim 8, wherein, to detect the presence of blood in the follicular fluid, the processing engine is to analyze red, green, and blue (RGB) colored pixels in each of the image frames.

14. The system as claimed in claim 10, wherein the notification engine is to provide volumetric analysis of the follicular fluid collected in the collection tube on the display unit.

15. The system as claimed in claim 8, wherein the processing engine is to compute a percentage of red pixels in the image frames over a time period for which the flow of the follicular fluid is detected.

16. The system as claimed in claim 8, wherein the processing engine is to perform a background correction on the image frames prior to processing the image frames.

\* \* \* \* \*